(12) United States Patent
Wang et al.

(10) Patent No.: US 11,836,605 B2
(45) Date of Patent: Dec. 5, 2023

(54) METEOROLOGICAL BIG DATA FUSION METHOD BASED ON DEEP LEARNING

(71) Applicants: Nanjing University of Information Science and Technology, Nanjing (CN); National Climate Center, Beijing (CN)

(72) Inventors: Guojie Wang, Nanjing (CN); Xikun Wei, Xinghua (CN); Guofu Wang, Beijing (CN); Tong Jiang, Beijing (CN); Yanjun Wang, Nanjing (CN); Mingyue Lu, Nanjing (CN)

(73) Assignees: Nanjing University of Information Science and Technology, Nanjing (CN); National Climate Center, Beijing (CN)

( * ) Notice: Subject to any disclaimer, the term of this patent is extended or adjusted under 35 U.S.C. 154(b) by 39 days.

(21) Appl. No.: 17/932,860

(22) Filed: Sep. 16, 2022

(65) Prior Publication Data
US 2023/0351164 A1 Nov. 2, 2023

(30) Foreign Application Priority Data
Apr. 27, 2022 (CN) .......................... 202210450508.6

(51) Int. Cl.
*G06N 3/08* (2023.01)
*G06N 3/048* (2023.01)

(52) U.S. Cl.
CPC ............... *G06N 3/048* (2023.01); *G06N 3/08* (2013.01)

(58) Field of Classification Search
CPC ...................................................... G06N 3/08
See application file for complete search history.

(56) References Cited

U.S. PATENT DOCUMENTS

2020/0372349 A1\* 11/2020 Gaitan Ospina ..... G06N 3/0454

OTHER PUBLICATIONS

Liu et al., "Climate Downscaling Using YNet: A Deep Convolutional Network with Skip Connections and Fusion", 2020 (Year: 2020).\*

(Continued)

*Primary Examiner* — Selene A. Haedi
(74) *Attorney, Agent, or Firm* — Stanek Lemon Crouse & Meeks, P.A.

(57) ABSTRACT

The present disclosure provides a meteorological big data fusion method based on deep learning, including the following steps: constructing multi-source meteorological data samples; according to an original resolution of different climate variables, selecting a corresponding super-resolution multiple to obtain an optimized super-resolution module under the constraint of maximizing information retention efficiency; constructing a spatial-temporal attention module using a focused attention mechanism, and selecting a corresponding time stride according to periodic characteristics of different climate variables; constructing a meteorological data fusion model in combination with the optimized super-resolution model and the spatial-temporal attention module; taking a minimum resolution of climate variables as a loss function, and training the meteorological data fusion model with the multi-source meteorological data samples; and importing the acquired real-time meteorological data from multiple data sources into the trained meteorological data fusion model to obtain high-resolution fused meteorological data.

7 Claims, 4 Drawing Sheets

(56) References Cited

OTHER PUBLICATIONS

Xia et al., "Single image rain removal via a simplified residual dense network", 2018 (Year: 2018).*
Zhao et al., "Residual Dense Network Based on Channel-Spatial Attention for the Scene Classification of a High-Resolution Remote Sensing Image", 2020 (Year: 2020).*
Zhang et al., "Deformable and Residual Convolutional Network for Image Super-Resolution", 2021 (Year: 2021).*
Li et al., "Multi-scale Residual Network for Image Super-Resolution", 2018 (Year: 2018).*
Liang et al., "GeoMAN: Multi-level Attention Networks for Geo-sensory Time Series Prediction", (Year: 2018).*
Long et al., "RXDNFuse: A aggregated residual dense network for infrared and visible image fusion", 2021 (Year: 2021).*

* cited by examiner

METEOROLOGICAL BIG DATA FUSION METHOD BASED ON DEEP LEARNING

CROSS REFERENCE TO RELATED APPLICATION

This patent application claims the benefit and priority of Chinese Patent Application No. 202210450508.6, filed on Apr. 27, 2022, the disclosure of which is incorporated by reference herein in its entirety as part of the present application.

TECHNICAL FIELD

The present disclosure belongs to the technical field of meteorological data fusion processing, and in particular, to a meteorological big data fusion method based on deep learning.

BACKGROUND ART

At present, global warming severely affects the ecological environment, resulting in frequent extreme disasters and rapid intensification of desertification. In order to prevent the deterioration of the ecological environment and reduce the losses caused by disasters, the causes and mechanisms of climate change must be studied in depth. Accurate meteorological data is the basis for in-depth study of meteorological problems. In addition to traditional meteorological observation stations, with the development of remote sensing technology, the number of satellites dedicated to meteorological observation is also increasing, which also brings a large amount of meteorological satellite observation data. In addition, climate models and earth system models that couple the various layers of the surface and fully consider physical and biological processes can also be used to study climate change. These models have been continuously updated to address more scientific questions. In addition, new earth system models are continuously being developed. Meteorological observation data (station observation and remote sensing observation) and meteorological model data together form a massive meteorological dataset including various meteorological elements such as temperature, precipitation, and soil moisture. It is estimated that the data volume of CMIP6 in the earth system model alone will reach 30 PB. Meteorological station observations can only provide single point data, not spatial surface data. In addition, due to the influence of satellite reentry cycle and weather conditions, remote sensing meteorological observation data are not continuous in time and there are also many missing values in space.

Therefore, multi-source meteorological data are often used for research. In the process of using these data, there are mainly the following problems: 1) The spatial resolution of multi-source meteorological data is inconsistent and rough. The resolutions of meteorological data from different sources are inconsistent. Taking climate model data as an example, except for high-precision regional climate models, the resolutions of most model data are higher than 2°. 2) The multi-source meteorological data is inconsistent. Due to the use of meteorological data from different sources, the systematic errors of the data itself are not the same, which will have a negative impact on the final results. 3) Traditional methods cannot effectively utilize the spatial-temporal information contained in the multi-source meteorological data. Taking the earth system model data as an example, when it is used for research, the average method is usually adopted. The overall results of this method are generally superior to the results of a single model, but the effect is poor in some local areas. In addition, due to the large difference in the resolution of earth system models, information loss will also be caused in the process of difference.

SUMMARY

Technical problem to be solved: the present disclosure provides a meteorological big data fusion method based on a deep learning method in combination with big data attributes of meteorological data, which can solve the problem of the difference in resolution of multi-source meteorological data.

Technical Solution:

A meteorological big data fusion method based on deep learning includes the following steps:

S1, acquiring meteorological data from multiple data sources, preprocessing the meteorological data from multiple data sources, and constructing multi-source meteorological data samples;

S2, taking a residual dense network (RDN) as an original super-resolution model, and optimizing input and output parts of the original super-resolution model in combination with characteristics of the data sources and data fusion requirements; in combination with meteorological data features of all of the data sources (there are a large number of teleconnections in meteorological data), adding a corresponding first feature extraction module to the optimized original super-resolution model (a convolutional neural network is generally used for feature extraction, which has a limited receptive field and cannot fully extract telecorrelation features of meteorological data), and adding deformable convolution in parallel to the first feature extraction module to increase the receptive field of the network and enhance the ability of the network to extract features in this area; and according to an original resolution of different climate variables, selecting a corresponding super-resolution multiple to obtain an optimized super-resolution module under the constraint of maximizing information retention efficiency;

S3, constructing a spatial-temporal attention module using a focused attention mechanism, and selecting a corresponding time stride according to periodic characteristics of different climate variables, where the spatial-temporal attention module is configured to calculate attention distribution of the multi-source meteorological data, calculate a weighted average of attention according to the attention distribution, and obtain local features of the meteorological data according to the weighted average of attention;

S4, constructing a meteorological data fusion model in combination with the optimized super-resolution model and the spatial-temporal attention module, where the super-resolution model is mainly composed of a second feature extraction module and the super-resolution module, the feature extraction module in the original super-resolution model cannot learn non- local and temporal features of meteorological data, and in order to extract the features of meteorological data in this aspect, the spatial-temporal attention module is introduced into the second feature extraction module; and taking a minimum resolution of climate variables as a loss function, and training a meteorological data fusion model with the multi-source meteorological data samples, where the meteorological data fusion model includes an input module, the second feature extraction module, the spatial-temporal attention module, the super-resolution module, an addition module, and an output module that are connected in sequence; and the input module is configured to arrange meteorological data samples within a specified time range before and after a time t in time sequence, import the meteorological data samples into the feature extraction module for local feature extraction, extract non-local and temporal features of the meteorological data through the spatial-temporal attention module, and send the features to the output module after being processed by the super-resolution module and the addition module on one hand, and send the meteorological data samples to the output module after being scaled by the downscaling module to be uniformly fused into fused meteorological data at the time t by the output module on the other hand; and S5, importing the acquired real-time meteorological data from multiple data sources into the trained meteorological data fusion model to obtain high-resolution fused meteorological data.

Further, a process of acquiring meteorological data from multiple data sources, preprocessing the meteorological data from multiple data sources, and constructing multi-source meteorological data samples in step S1 may include the following sub-steps:

S11, for different climate parameters, processing meteorological data of all of the data sources in a unified unit;

S12, normalizing the meteorological data in a unified unit; and

S13, constructing training samples using the normalized meteorological data, and dividing the training samples into a training set, a test set, and a validation set according to a certain ratio to generate a multi-source meteorological data sample dataset.

Further, in step S12, min-max normalization or Z-score normalization may be used to normalize the meteorological data in a unified unit.

Further, a process of optimizing input and output parts of the original super-resolution model in combination with characteristics of the data sources and data fusion requirements in step S2 may include the following sub-steps:

taking the RDN as the original super-resolution model, optimizing the input and output parts of the original super-resolution model, expanding input channels to N, and reducing output channels to 1, where N is a number of data sources.

Further, in step S2, the feature extraction module may include 8 convolutional networks with repeated residual structures and 8 deformable convolutional networks with repeated residual structures in parallel.

Further, a process of constructing a spatial-temporal attention module using a focused attention mechanism in step S3 may include the following sub-steps:

S31, using $X=[x_1, \ldots, x_K]$ represent K groups of input information, and introducing a query vector q to represent information that is more important to a fusion process of K input meteorological data $[x_1, \ldots, x_K]$; calculating a correlation between each meteorological data and the query vector by a scoring function; and using an attention variable $c \in [1, K]$ to represent an index position of selected information;

S32, calculating given q and X, and calculating an attention distribution probability $\alpha_k$ of k-th meteorological data:

$$\alpha_k = p(c = k | X, q) = \text{softmax}(s(x_k, q)) = \frac{\exp(s(x_k, q))}{\sum_{j=1}^{K} \exp(s(x_j, q))}$$

where s(x,q) is an attention scoring function:

$$s(x, q) = \frac{x^T q}{\sqrt{D}},$$

and D is a data latitude of an input vector; and the attention distribution $\alpha_k$ is a degree of attention paid to the k-th input meteorological data;

S33, according to the following attention function formula, calculating the weighted average of the attention distribution of the meteorological data:

$$att(X, q) = \sum_{n=1}^{N} a_k x_k;$$

and

S34, obtaining local attention features according to a feature map result returned by att(X,q), where the feature map result returned by att(X,q) is between 0 and 1, and a feature map result closer to 1 indicates that this area has a greater influence on final data fusion results.

Further, the spatial-temporal attention module may calculate a similarity with a reference frame at each time to obtain an attention feature map of a feature map at each time, perform a product operation with the reference frame in space, adjust a weight proportion of influence of different times in a data fusion task, fuse the extracted feature maps again, obtain a spatial attention feature map at different scales through a pyramid structure, and obtain a feature map of a spatial-temporal attention mechanism after upsampling.

Beneficial Effects:

First, the meteorological big data fusion method based on deep learning of the present disclosure introduces deep learning super-resolution technology to achieve high-resolution fusion, which can solve the problem of the difference in resolution of multi-source meteorological data. During fusion, coarse-resolution data can be directly input, and high-resolution fusion data can be directly obtained, which avoids information loss due to downward interpolation as much as possible.

Second, the meteorological big data fusion method based on deep learning of the present disclosure introduces a local attention mechanism to highlight local features. Compared with images in deep learning, meteorological data has not only global features, but also more local features in space. In the fusion process, local features highlight the response to extreme meteorological events than global features, so the present disclosure introduces the attention mechanism in deep learning to solve this problem.

Third, since the meteorological data also has a strong relationship in the time dimension, the meteorological big data fusion method based on deep learning of the present disclosure also adds the attention mechanism in the time dimension to strengthen the mining of time latitude information.

Fourth, the present disclosure is an end-to-end method, and high-resolution fusion data can be obtained by inputting multiple sets of meteorological data. The present disclosure can not only combine the advantages of multi-source meteorological data, but also fully mine the spatial-temporal information in meteorological big data, generate a set of higher-resolution and more accurate fusion data products, reduce data uncertainty, and highlight extreme events in meteorological big data. On the one hand, it can provide data support for accurate analysis of climate change and decision support for formulation of reasonable development policies. On the other hand, it provides data support for accurate assessment and reasonable management of meteorological disaster risks.

DETAILED DESCRIPTION OF THE EMBODIMENTS

The following embodiments enable those skilled in the art to understand the present disclosure more comprehensively, but do not limit the present disclosure in any way.

Figure 1:
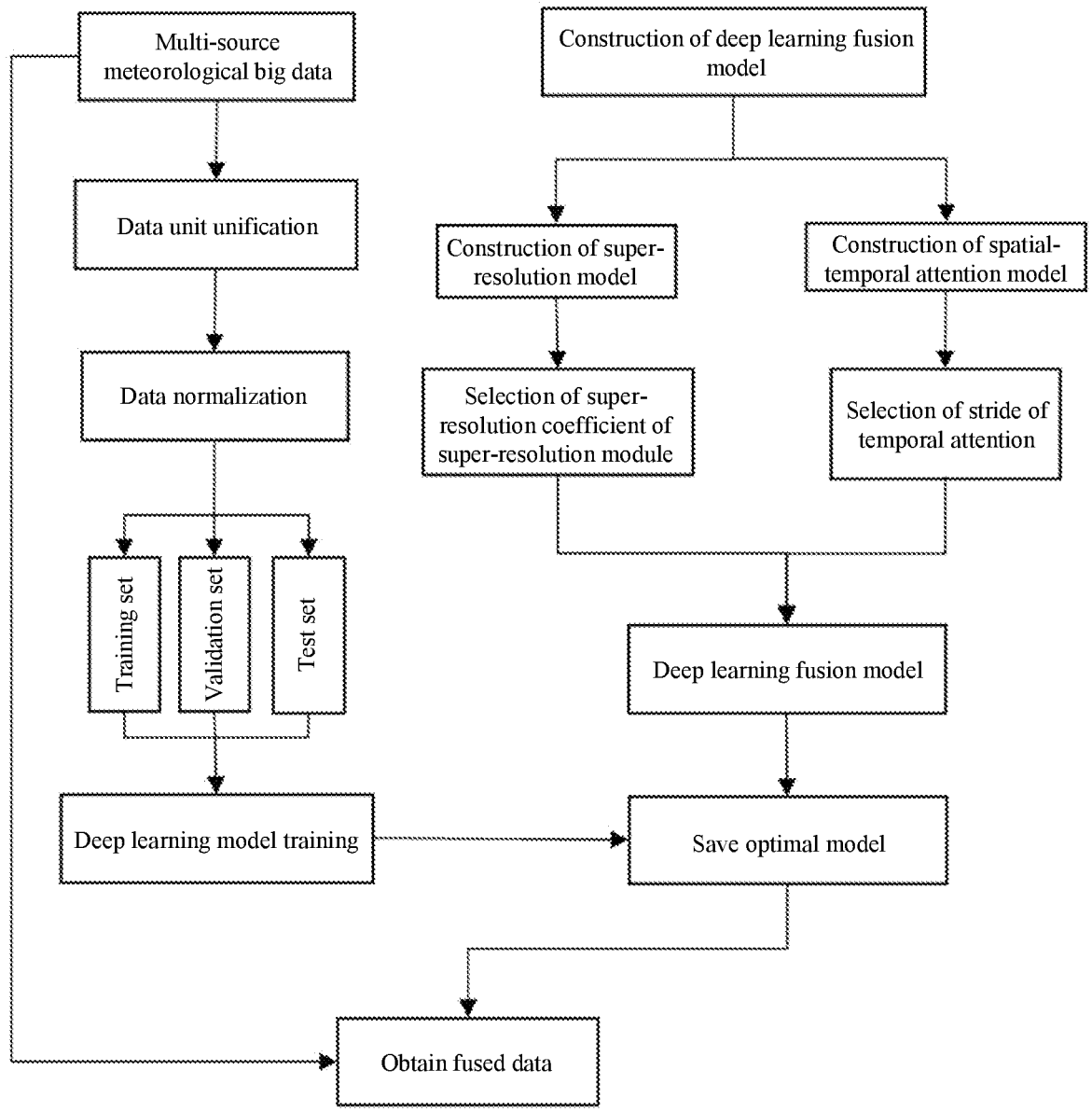
FIG. 1 is a flow chart of a meteorological big data fusion method based on deep learning.

FIG. 1 is a flow chart of a meteorological big data fusion method based on deep learning. With reference to FIG. 1, the fusion method includes the following steps.

S1, Meteorological data is acquired from multiple data sources. The meteorological data from multiple data sources is preprocessed. Multi-source meteorological data samples are constructed.

S2, An RDN is taken as an original super-resolution model, and input and output parts of the original super-resolution model are optimized in combination with characteristics of the data sources and data fusion requirements. In combination with meteorological data features of all of the data sources, a corresponding feature extraction module is added to the optimized original super-resolution model. According to an original resolution of different climate variables, a corresponding super-resolution multiple is selected to obtain an optimized super-resolution module under the constraint of maximizing information retention efficiency.

S3, A spatial-temporal attention module is constructed using a focused attention mechanism, and a corresponding time stride is selected according to periodic characteristics of different climate variables. The spatial-temporal attention module is configured to calculate attention distribution of the multi-source meteorological data, calculate a weighted average of attention according to the attention distribution, and obtain local features of the meteorological data according to the weighted average of attention.

S4, A meteorological data fusion model is constructed in combination with the optimized super-resolution model and the spatial-temporal attention module. The super-resolution model includes a second feature extraction module and the super-resolution module. Non-local and temporal features of the meteorological data are extracted by introducing the spatial-temporal attention module into the second feature extraction module. A minimum resolution of climate variables is taken as a loss function, and a meteorological data fusion model is trained with the multi-source meteorological data samples. The meteorological data fusion model includes an input module, the second feature extraction module, the spatial-temporal attention module, the super-resolution module, an addition module, a downscaling module, and an output module that are connected in sequence.

The input module is configured to arrange meteorological data samples within a specified time range before and after a time t in time sequence, import the meteorological data samples into the second feature extraction module for feature extraction and send the extracted features to the output module after being processed by the spatial-temporal attention module, the super-resolution module, and the addition module in sequence on one hand, and send the meteorological data samples to the output module after being scaled by the downscaling module to be uniformly fused into fused meteorological data at the time t by the output module on the other hand.

S5, The acquired real-time meteorological data from multiple data sources is imported into the trained meteorological data fusion model to obtain high-resolution fused meteorological data.

Detailed content is as follows:

1. Meteorological data preprocessing (1) Unit unification

Due to inconsistent sources of meteorological data, the units are often inconsistent. Therefore, the first step in data processing is to unify the units of data from different sources. Taking temperature as an example, some data are stored as Kelvin temperature K and some data are stored as Celsius C, there is a certain relationship between the two, C=K−273.15.

(2) Data normalization

Data normalization generally refers to the method of converting data features to the same scale, for example, mapping the data to the interval of [0,1] or [4,1]. This step will improve the efficiency of model training. Commonly used normalization methods include min-max normalization and Z-score normalization. Min-max normalization is a relatively simple normalization method. Assuming there are K samples $(x^{(k)})_{k=1}^{K}$, the normalized feature results are as follows:

$$\hat{x}^{(k)} = \frac{x^{(k)} - \min(x^{(k)})}{\max(x^{(k)}) - \min(x^{(k)})}. \tag{1}$$

Z-score normalization is derived from a statistically standard score that adjusts all features to have a mean of 0 and a variance of 1. Assuming there are K samples $(x^{(k)})_{k=1}^{K}$, first, its mean and variance are calculated:

$$\mu = \frac{1}{K}\sum_{k=1}^{K} x^{(k)}; \tag{2}$$

and $$\sigma^2 = \frac{1}{K}\sum_{k=1}^{K}(x^{(k)} - \mu). \tag{3}$$

Then, new features are calculated:

$$\hat{x}^{(k)} = \frac{x^{(k)} - \mu}{\sigma}. \tag{4}$$

(3) Division of dataset

Model training data is constructed using the normalized data, and divided into a training set, a test set, and a validation set according to a certain ratio (usually set to 6:2:2) to prepare for subsequent training.

Figure 3:
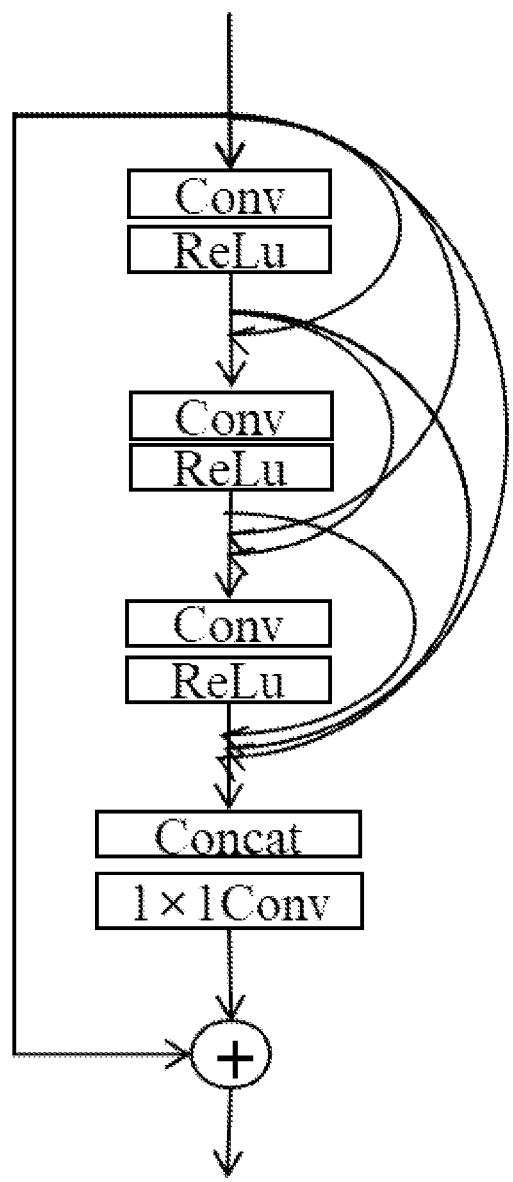
FIG. 3 is a schematic diagram of a main structure of a super-resolution module.

2. Construction of super-resolution model and selection of super-resolution coefficient (1) Construction of super-resolution model Super-resolution, that is, the super-resolution technology, refers to reconstruction of high-resolution images from low-resolution images. This technology has been widely developed and applied in the field of computer vision, and there are a large number of mature algorithms that can be used for reference. With reference to FIG. 3, the original super-resolution model adopted in the present disclosure is RDN, which combines the characteristics of Resnet and Densenet. Each layer is related to the final result, which can make full use of the hierarchical features of the initial low-resolution image. On this basis, it is modified according to the requirements of the fusion of multi-source meteorological data. From the perspective of input and output, the output image in computer vision only has three low-resolution channels of R, G, and B, while there may be dozens of sets of multi-source meteorological data to be fused. Finally, the output only needs one set of high-resolution data, so the input and output parts of the model are modified. In addition, due to the larger amount of multi-source meteorological data, in order to extract features more excellently, a feature extraction module is added to the model to extract the features of meteorological data. The feature extraction module is composed of 8 convolutional networks with repeated residual structures.

(2) Selection of super-resolution coefficient

The resolution of multi-source meteorological data is quite different, and the amount of data corresponding to different climate variables is also different. To meet the needs of different variables, the fusion algorithm invented has 2-fold, 4-fold and 8-fold super-resolution effects. When different climate variables are considered, it is necessary to determine the selection of the super-resolution multiple according to the original resolution of this variable, so as to retain the information in the original data to the greatest extent.

Figure 4:
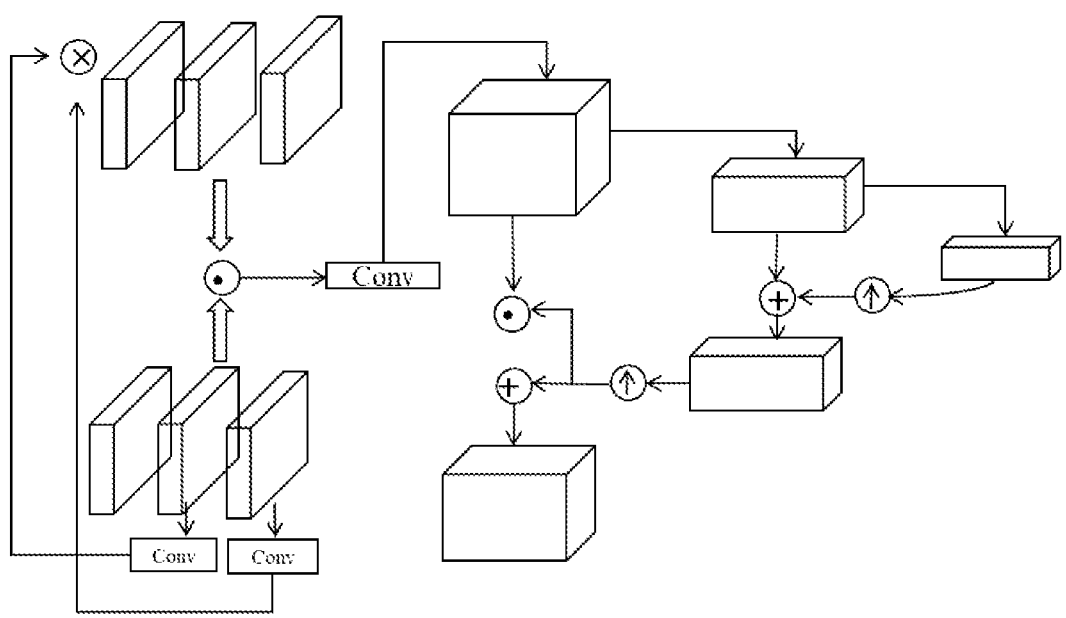
FIG. 4 is a schematic structural diagram of a spatial-temporal attention module.

3. Construction of spatial-temporal attention model and step stride of temporal attention (1) Selection of spatial-temporal attention for model construction In the process of learning, human beings can selectively absorb a small part of the information they need from a large amount of external information to focus on learning. This ability is called attention. With reference to FIG. 4, the present disclosure uses a focused attention mechanism to construct a model, and focused attention can be understood as top-down conscious attention, which means that there are expected goals, initiative, plans, and conscious focusing on specific objects and goals. In the spatial-temporal dimension, the local features of the meteorological data of interest are obtained according to the spatial-temporal attention mechanism.

The calculation of the attention mechanism is mainly divided into three steps: first, the attention distribution of the meteorological data is calculated, then the weighted average of attention is calculated according to the attention distribution of the meteorological data, and finally the local features of the meteorological data are obtained according to the weighted attention distribution.

1) Calculation of attention distribution of meteorological data $X=[x_1, \ldots, x_k]$ is used to represent K groups of input information. In order to select the information that is more important for data fusion from the K input meteorological data $[x_1, \ldots, x_k]$, a vector related to data fusion needs to be introduced, which is called query vector, and a correlation between each meteorological data and the query vector is calculated through a scoring function. Assuming that a query variable related to data fusion is q, an attention variable $c \in [1,K]$ is used to represent an index position of the selected information. Given q and X are calculated, and an attention distribution probability $\alpha_k$ of k-th meteorological data is calculated:

$$\alpha_k = p(c = k|X, q) = \text{softmax}(s(x_k, q)) = \frac{\exp(s(x_k, q))}{\sum_{j=1}^{K} \exp(s(x_j, q))}, \quad (5)$$

where is an attention scoring function, and the scaled dot product model is commonly used for calculation:

$$s(x, q) = \frac{x^T q}{\sqrt{D}}, \quad (6)$$

where D is a data latitude of an input vector.

2) Calculation of weighted average of attention distribution of meteorological data The attention distribution $\alpha_k$ can be interpreted as a degree of attention paid to the K-th input meteorological data in the query vector q of data fusion. The attention function formula is as follows:

$$att(X, q) = \sum_{n=1}^{N} \alpha_k x_k. \quad (7)$$

3) Obtaining of local features of meteorological data att(X,q) returns a feature map result between 0 and 1. A feature map result closer to 1 represents the area in a feature map that has a greater influence on final data fusion results. Based on this, local attention features are obtained.

(2) Selection of time stride of temporal attention

Because different climate variables have different periodic characteristics, the monthly temperature data is taken as an example, which takes the year as the cycle. In order to fully mine the information of time sequence, appropriate time strides need to be selected for the periodic changes of different climate variables.

The spatial-temporal attention model calculates a similarity with a reference frame at each time to obtain an attention feature map of a feature map at each time, performs a product operation with the reference frame in space (equivalent to adjusting a weight proportion of influence of different times in a data fusion task), fuses the extracted feature maps again, obtains a spatial attention feature map at different scales through a pyramid structure, and obtains a feature map of a spatial-temporal attention mechanism after upsampling.

4. Data fusion based on deep learning (1) Model training

Figure 2:
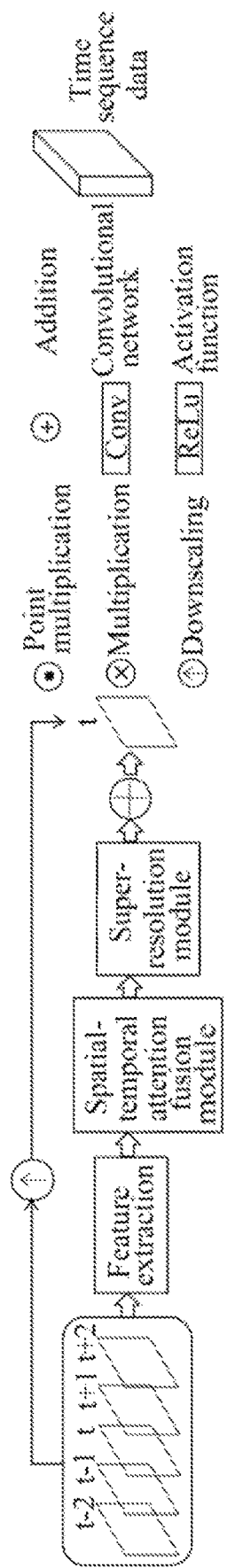
FIG. 2 is an overall schematic diagram of a meteorological fusion model.

After the dataset and model are prepared, the super-resolution coefficient and the stride of temporal attention are determined, and the constructed deep learning model can be used for training. FIG. 2 is an overall schematic diagram of a meteorological fusion model. The observation data of corresponding meteorological variables is selected as the training reference data used. The training set is used for training, the test set is used for testing, and the validation set is used to validate the model. During model training, the model parameters need to be fine-tuned according to the results of the training set and the test set. The main adjustment methods of the neural network include increasing and decreasing the learning rate, adding regularization to the network, weight decay, adjustment of the loss function, and early stopping of training. Until the results of the validation set and the results of the training set achieve excellent results, the model with the optimal accuracy is saved.

(2) Data generation

The optimal model trained in step (1) is used, and multi-source meteorological data is input into the model to obtain high-resolution fusion data.

In the study of climate change using multi-source meteorological data, the traditional linear average method cannot make full use of the advantages of multi-source meteorological data. Data fusion can make full use of the advantages of data from different sources, and consider the massive data nature of multi-source meteorological data. It is difficult for traditional data fusion methods to fully explore the large amount of spatial-temporal information contained therein. The deep learning method has been proved to be superior in processing big data. Therefore, a fusion method based on the deep learning super-resolution algorithm is provided, and on this basis, the spatial-temporal attention mechanism is added in combination with the characteristics of the meteorological data. This method can realize multi-source meteorological big data fusion, generate high-resolution fusion data products, reduce data uncertainty, and highlight extreme events in meteorological big data, which provides data support for studying the causes and mechanisms of climate change and meteorological disaster risk assessment and management.

What is claimed is:

1. A meteorological big data fusion method based on deep learning, comprising the following steps:
   S1, acquiring meteorological data from multiple data sources, preprocessing the meteorological data from the multiple data sources, and constructing multi-source meteorological data samples;
   S2, taking a residual dense network (RDN) as an original super-resolution model, and optimizing input and output parts of the original super-resolution model in combination with characteristics of the multiple data sources and data fusion requirements; in combination with meteorological data features of all of the multiple data sources, adding a corresponding first feature extraction module to the optimized original super-resolution model, and adding deformable convolution in parallel to the added first feature extraction module to fully extract telecorrelation features of the meteorological data; and according to an original resolution of different climate variables, selecting a corresponding super-resolution multiple to obtain an optimized super-resolution model under a constraint of maximizing information retention efficiency;
   S3, constructing a spatial-temporal attention module using a focused attention mechanism, and selecting a corresponding time stride according to periodic characteristics of different climate variables, wherein the spatial-temporal attention module is configured to calculate attention distribution of the multi-source meteorological data samples, calculate a weighted average of attention according to the attention distribution, and obtain local features of the multi-source meteorological data samples according to the weighted average of attention;
   S4, constructing a meteorological data fusion model in combination with the optimized super-resolution model and the spatial-temporal attention module, wherein the optimized super-resolution model comprises a second feature extraction module and a super-resolution module, and non-local and temporal features of the multi-source meteorological data samples are extracted by introducing the spatial-temporal attention module into the second feature extraction module; and taking a minimum resolution of climate variables as a loss function, and training a meteorological data fusion model with the multi-source meteorological data samples, wherein the meteorological data fusion model comprises an input module, the second feature extraction module, the spatial-temporal attention module, the super-resolution module, an addition module, and an output module that are connected in sequence; and the input module is configured to arrange meteorological data samples within a specified time range before and after a time t in time sequence, import the meteorological data samples into the second feature extraction module for local feature extraction, extract the non-local and temporal features of the meteorological data samples through the spatial-temporal attention module, and send the local features and the non-local and temporal features to the output module after being processed by the super-resolution module and the addition module, and send the meteorological data samples to the output module after being scaled by a downscaling module to be uniformly fused into fused meteorological data at the time t by the output module; and
   S5, importing acquired real-time meteorological data from the multiple data sources into the trained meteorological data fusion model to obtain high-resolution fused meteorological data.

2. The meteorological big data fusion method based on deep learning according to claim 1, wherein acquiring the meteorological data from the multiple data sources, preprocessing the meteorological data from the multiple data sources, and constructing the multi-source meteorological data samples in step S1 comprises the following sub-steps:
   S1.1, for different climate parameters, processing meteorological data of all of the multiple data sources in a unified unit;
   S1.2, normalizing the meteorological data in athe unified unit; and
   S1.3, constructing training samples using the normalized meteorological data, and dividing the training samples into a training set, a test set, and a validation set according to a ratio of 6:2:2 to generate a multi-source meteorological data sample dataset.

3. The meteorological big data fusion method based on deep learning according to claim 2, wherein in step S1.2, min-max normalization or Z-score normalization is used to normalize the meteorological data in the unified unit.

4. The meteorological big data fusion method based on deep learning according to claim 1, wherein optimizing the input and output parts of the original super-resolution model in combination with characteristics of the multiple data sources and data fusion requirements in step S2 comprises the following sub-steps:
   taking the RDN as the original super-resolution model, optimizing the input and output parts of the original super-resolution model, expanding input channels to N, and reducing output channels to 1, wherein N is a number of data sources.

5. The meteorological big data fusion method based on deep learning according to claim 1, wherein in step S2, the first feature extraction module comprises 8 convolutional networks with repeated residual structures.

6. The meteorological big data fusion method based on deep learning according to claim 1, wherein constructing the spatial-temporal attention module using the focused attention mechanism in step S3 comprises the following sub-steps:

S3.1, using X=[$x_1$, ..., $x_k$] to represent K groups of input information, and introducing a query vector q to represent information that is more important to a fusion process of K input meteorological data [$x_1$, ..., $x_k$]; calculating a correlation between each meteorological data and the query vector by a scoring function; and using an attention variable c∈[1, K] to represent an index position of selected information;

S3.2, calculating given q and X, and calculating an attention distribution probability $\alpha_k$ of k-th meteorological data:

$$\alpha_k = p(c = k|X, q) = \text{softmax}(s(x_k, q)) = \frac{\exp(s(x_k, q))}{\sum_{j=1}^{K}\exp(s(x_j, q))},$$

wherein s(x,q) is an attention scoring function:

$$s(x, q) = \frac{x^T q}{\sqrt{D}},$$

$x^T$ represents a transposition of x, and D is a data latitude of an input vector; and the attention distribution probability $\alpha_k$ is a degree of attention paid to the k-th input meteorological data;

S3.3, according to thea following attention function formula, calculating mea weighted average of the attention distribution probability of the meteorological data:

$$att(X, q) = \sum_{n=1}^{N}\alpha_k x_k;$$

and

S3.4, obtaining local attention features according to a feature map result returned by att(X,q), wherein the feature map result returned by att(X,q) is between 0 and 1, and a feature map result closer to 1 indicates that a corresponding area in a feature map has a greater influence on final data fusion results.

7. The meteorological big data fusion method based on deep learning according to claim 1, wherein the spatial-temporal attention module calculates a similarity with a reference frame at each time to obtain an attention feature map of a feature map at each time, performs a product operation with the reference frame in space, adjusts a weight proportion of influence of different times in a data fusion task, fuses extracted feature maps, obtains a spatial attention feature map at different scales through a pyramid structure, and obtains a feature map of a spatial-temporal attention mechanism after upsampling.

* * * * *